UNITED STATES PATENT OFFICE.

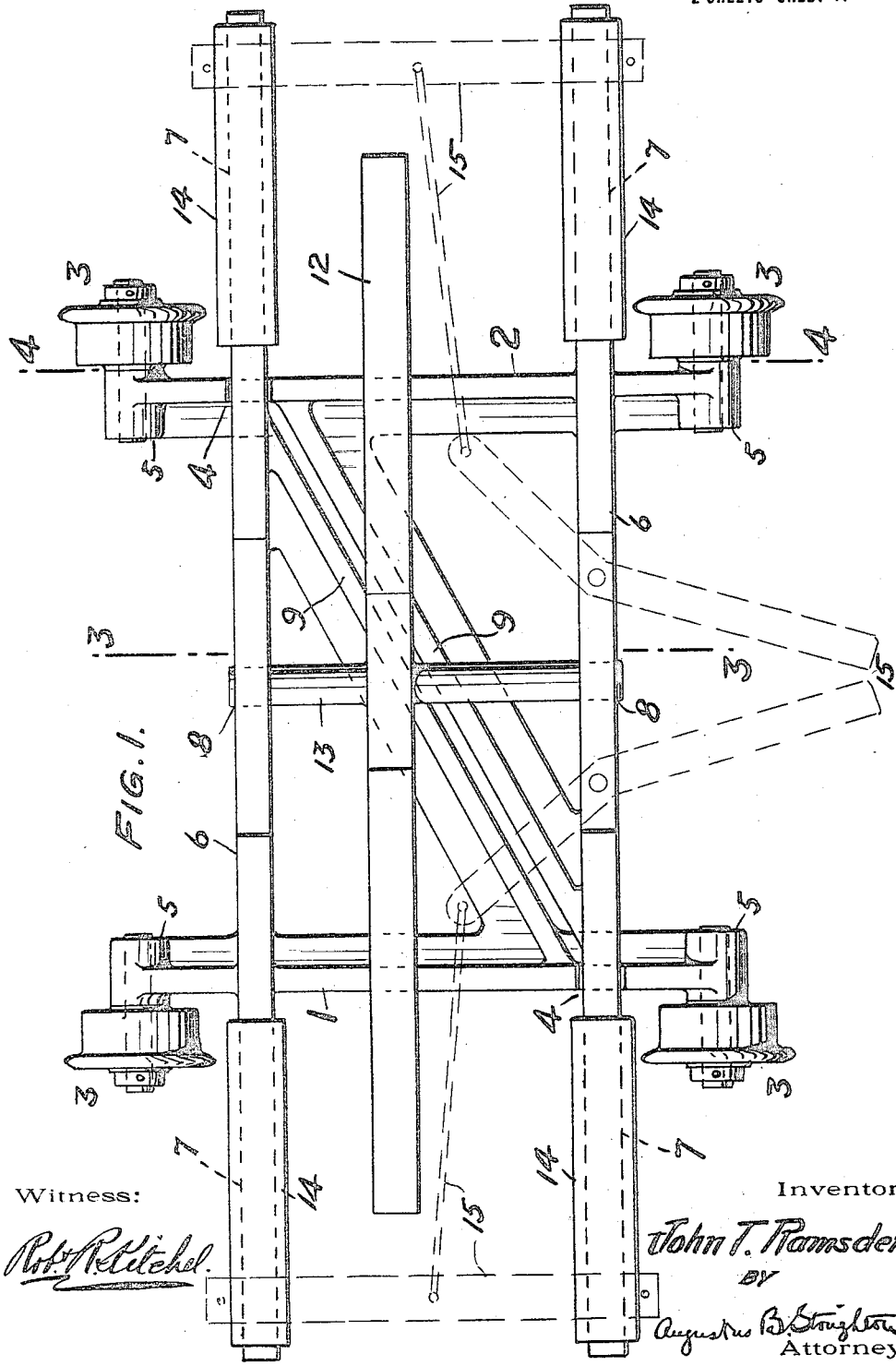

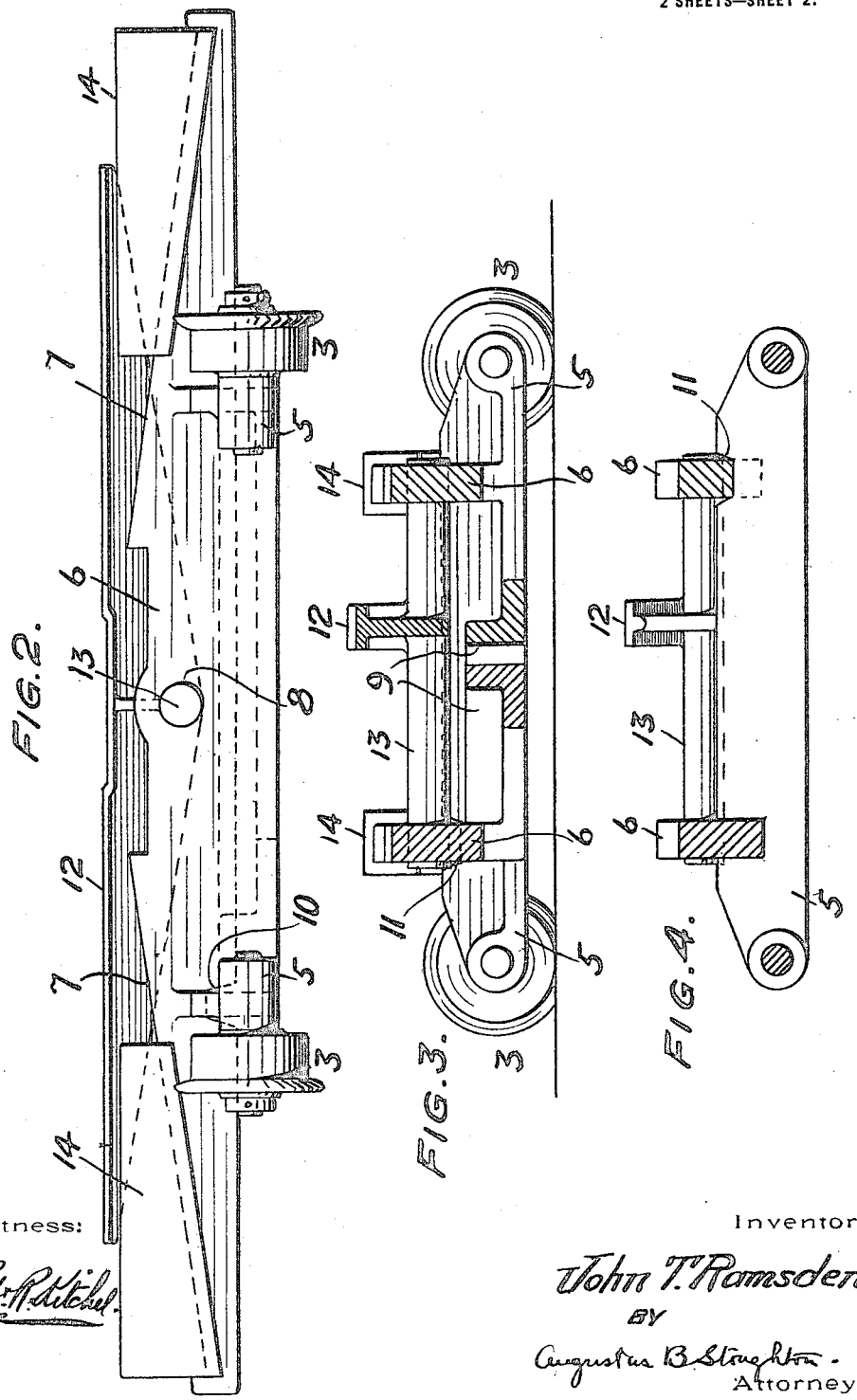

JOHN T. RAMSDEN, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA.

CAR FOR MOLDING-MACHINES.

1,225,273.                Specification of Letters Patent.        Patented May 8, 1917.

Application filed January 13, 1917.   Serial No. 142,231.

*To all whom it may concern:*

Be it known that I, JOHN T. RAMSDEN, a citizen of the United States, residing at Philadelphia, in the county of Philadelphia and State of Pennsylvania, have invented a certain new and useful Car for Molding-Machines and the like, of which the following is a specification.

The principal object of the present invention is to provide a four-wheeled truck or car which will stand without rocking on any sort of irregular surface and which constitutes a firm foundation upon which a mold may rest.

The invention will be claimed at the end hereof but will be first described in connection with the embodiment of it chosen for illustration in the accompanying drawings in which—

Figure 1, is a top or plan view.

Fig. 2, is a side view, and

Figs. 3 and 4, cross-sections taken respectively upon the lines 3—3 and 4—4, of Fig. 1.

Referring to the drawings the equalizing car comprises two interconnected truck members 1 and 2, each having three-point-support, two of said supports consisting of a pair of wheels and the third support consisting of a flexible connection 4, with the other truck member. A description of one truck member will suffice since both members are substantially the same. 5, is an axle member or frame to which the wheels 3, are connected, and 6, is a laterally arranged extension provided with reversely disposed wedge ways 7, and with a bearing 8. 9, is a diagonal brace. Each truck member consisting, as shown, of the parts 5, 6 and 9, is of generally triangular shape and the two truck members are laid together as shown. In the embodiment chosen for illustration the element 6, of each frame or truck member is connected with the element 5, of the other frame or truck member by notching each of these elements as at 10 and 11, and permitting the notched parts to mutually engage so as to form a flexible connection. The flexible connection, as shown, consists of two notches engaging each other with a loose fit. 12, is a flask receiving saddle having trunnions 13, mounted on the bearings 8. 14, are wedges mounted on the wedge ways 7, and adapted to be shifted as by means of links and levers 15.

Since each truck member has three points of support, namely, the two wheels 3, and the support at 4, afforded by the other member, it is evident that the car or truck will stand on an irregular surface without rocking and the saddle 12, and its complemental wedges 14, in connection with the described truck or car will provide a firm foundation for a mold.

It will be obvious to those skilled in the art to which the invention relates that modifications may be made in details of construction and arrangement without departing from the spirit of the invention which is not limited as to those matters or in any way other than the prior art and the appended claims may require.

What I claim is:

1. An equalizing car comprising the combination of two truck members free for twisting movement in respect to each other and each having three-point support, two of said supports consisting of a pair of wheels and the third support being inelastic and consisting of the other truck members, substantially as described.

2. An equalizing car comprising the combination of two truck members free for twisting movement in respect to each other and each having a pair of wheels, and flexible inelastic connections by which each member is supported by the other, substantially as described.

3. An equalizing car comprising the combination of two triangular truck members each provided with a pair of wheels, and inelastic connections whereby each supports the other.

4. An equalizing car comprising the combination of two truck members free for twisting movement in respect to each other and each having a pair of wheels and each provided with a laterally disposed extension, and inelastic means for connecting the lateral extension of each member for support by the other member, substantially as described.

5. An equalizing car comprising the combination of two truck members each having a pair of wheels and a wedge way and a bearing, means for supporting each truck member upon the other, a saddle pivotally mounted in said bearing, and wedge mechanism for the wedge ways, substantially as described.

6. A movable equalizing device comprising the combination of two members free for twisting movement in respect to each other and each having three-point-support of which two supports are provisions of the member and of which the third support is inelastic and consists of the other member, substantially as described.

JOHN T. RAMSDEN.

Copies of this patent may be obtained for five cents each, by addressing the "Commissioner of Patents, Washington, D. C."